United States Patent [19]
Fox et al.

[11] 3,810,656
[45] May 14, 1974

[54] VEHICLE BODY ENERGY ABSORBING PANEL

[75] Inventors: Robert M. Fox, Warren; Karl Truran, Southfield, both of Mich.

[73] Assignee: General Motors Corporation, Detroit, Mich.

[22] Filed: Feb. 26, 1973

[21] Appl. No.: 335,445

[52] U.S. Cl............ 280/150 B, 188/1 C, 296/65 A, 297/395
[51] Int. Cl............................................. B60r 21/02
[58] Field of Search .......... 296/65 A; 297/216, 390, 297/395; 280/150 B; 188/1 C

[56] References Cited
UNITED STATES PATENTS

| | | | |
|---|---|---|---|
| 3,729,228 | 4/1973 | Inoue et al. | 280/150 B X |
| 3,744,818 | 7/1973 | Sandberg | 280/150 B |
| 3,198,543 | 8/1965 | Presunka | 280/150 B |

FOREIGN PATENTS OR APPLICATIONS

| | | | |
|---|---|---|---|
| 422,551 | 4/1967 | Switzerland | 280/150 B |

Primary Examiner—Robert J. Spar
Assistant Examiner—Ross Weaver
Attorney, Agent, or Firm—Herbert Furman

[57] ABSTRACT

An elongated energy absorbing panel extends between the side pillars of a vehicle body in proximity to the upper seat back edge of the vehicle front seat so as to function as a headrest for front seat occupants and a frontal restraint for rear seat occupants. Each panel end supports a channel member extending longitudinally of the vehicle and opening to an opposed channel member on the adjacent side pillar, and slide members slidably interconnect each pair of these channel members so that the panel is supported for both forward and rearward movement. A first pair of die and draw rod arrangements are respectively mounted between the side pillars and the panel ends, and absorb a controlled level of energy during forward panel movement so as to cushion the frontal restraint provided for rear seat occupants. Tongue and slot connections of these arrangements slidably release them from their mounted relationship during rearward panel movement so they do not limit such rearward movement. A similar second pair of die and draw rod arrangements are likewise mounted between the side pillars and the panel ends, but are oriented in the opposite direction to the first pair so that they absorb energy during rearward panel movement and are slidably released from their mounted relationship during forward panel movement so as not to limit such forward movement. Two outboard knee pads and one center one are mounted on the vehicle floor below the panel and are movable forwardly during an impact upon engagement thereof by the knees of a forwardly moving rear seat occupant. Deformable slide strap arrangements extend between the outboard knee pads and the side pillars respectively adjacent to them so as to be deformed by such forward knee pad movement and to thereby absorb energy. The center knee pad is also provided with a suitable energy absorbing device to cushion its forward movement.

3 Claims, 7 Drawing Figures

PATENTED MAY 14 1974

PATENTED MAY 14 1974

VEHICLE BODY ENERGY ABSORBING PANEL

BACKGROUND OF THE INVENTION

This invention relates to a panel which is mounted within a vehicle body for energy absorbing movement, and more particularly to the manner in which such a panel is supported for such movement.

It is known to provide a panel which is mounted within a vehicle body for energy absorbing movement upon engagement thereof by an occupant during vehicle impact conditions. This energy absorbing movement of the panel and/or deformation of the panel absorbs the kinetic energy of the occupant so as to bring the occupant to rest in a cushioned manner that lessens the severity of the impact.

It is also known to mount this type of vehicle body panel by way of die and draw rod arrangements in order to provide energy absorption. This type of energy absorbing arrangement extends between the panel and the vehicle body and includes an elongated draw rod of a ductile material. The draw rod has a circular crossection which is received by an annular die whose diameter is smaller than the diameter of the draw rod. A first support member of the arrangement supports the die and a second support member thereof pulls one of the ends of the draw rod so that the draw rod is deformed during panel movement and provides the energy absorption that cushions the panel movement. Also, it is likewise known to vary the cross sectional area of the draw rod so that the level of energy absorption per unit length of draw rod deformation is controlled in a predetermined manner.

In certain instances, it is desirable to support a panel within a vehicle body for energy absorbing movement in both forward and rearward directions relative to the vehicle. If die and draw rod arrangements are used for this application, with one arrangement absorbing energy in one direction of panel movement and another in the opposite direction, it is possible for the support members of the die and draw rods of each arrangement to engage each other during energy absorbing movement of the other arrangement. If this engagement of these support members occurs, further movement of the panel in the direction providing energy absorption of the other arrangement will be limited for normal force levels resulting from occupant engagement with the panel during impacts.

Thus, in the past, it has not been possible to utilize die and draw rod arrangements to support an energy absorbing panel for movement in opposite directions.

SUMMARY OF THE INVENTION

The structure disclosed by the present invention includes an energy absorbing panel which is supported for dual directional energy absorbing movement by die and draw rod arrangements. The panel extends between the side pillars of a vehicle body and is located in proximity to the upper seat back edge of the vehicle front seat so as to function as both a headrest for front seat occupants and as a frontal restraint for rear seat occupants. During panel movement in either a forward or a rearward direction, one die and draw rod arrangement at each end of the panel provides energy absorption and another such arrangement at each panel end is slidably released from a mounted relationship between the panel and the side pillar by way of a tongue and slot connection. This release prevents the possibility of engagement of the support members of the other arrangements and consequent limiting of the panel movement. Likewise, during panel movement in the opposite direction, the other die and draw rod arrangements provide energy absorption and similar tongue and slot connections slidably release the die and draw rod arrangements which absorbed energy in the first direction of movement so as to likewise prevent limiting of panel movement in this opposite direction. Also, two outboard knee pads and one center one are mounted on the vehicle floor below the panel and function as frontal restraints for rear seat occupants. The outboard knee pads each include a deformable slide strap arrangement extending between it and the adjacent side pillar of the vehicle body so as to be deformable by forward knee pad movement and to thereby absorb energy. The center knee pad likewise includes a suitable energy absorbing device for cushioning its movement.

BRIEF DESCRIPTION OF THE DRAWINGS

An understanding of the present invention is readily apparent from the following detailed description of the preferred embodiment and the drawings in which.

DETAILED DESCRIPTION OF THE PREFERRED EMBODIMENT

Figure 1:
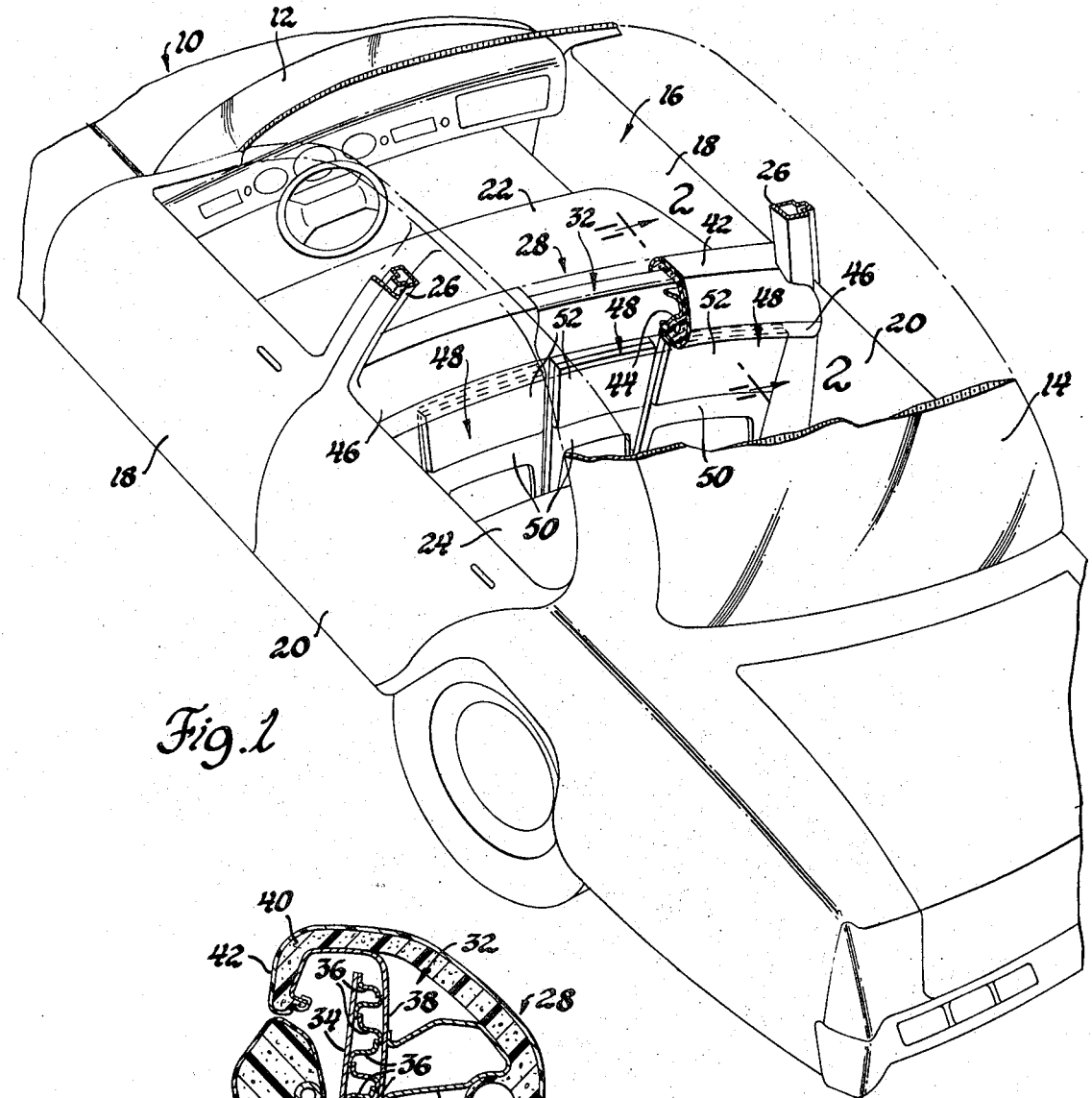
FIG. 1 is a partially broken away perspective view of a vehicle which includes an energy absorbing panel mounted in a manner according to this invention adjacent the upper seat back edge of the front seat and extending between the side pillars of the vehicle body.

Referring to FIG. 1 of the drawings, a vehicle body is generally indicated by 10 and includes a front windshield 12 and a rear window 14 at the forward and rearward ends of the vehicle body occupant compartment indicated generally by 16. Occupant compartment 16 is accessible by way of front and rear doors 18 and 20 so as to allow occupants to enter and leave the vehicle front and rear seats 22 and 24. The support for the front doors 18 is on the front hinge pillars, not shown, adjacent the front windshield 12, while the rear doors 20 are supported on the side pillars 26 of the vehicle body.

Figure 2:
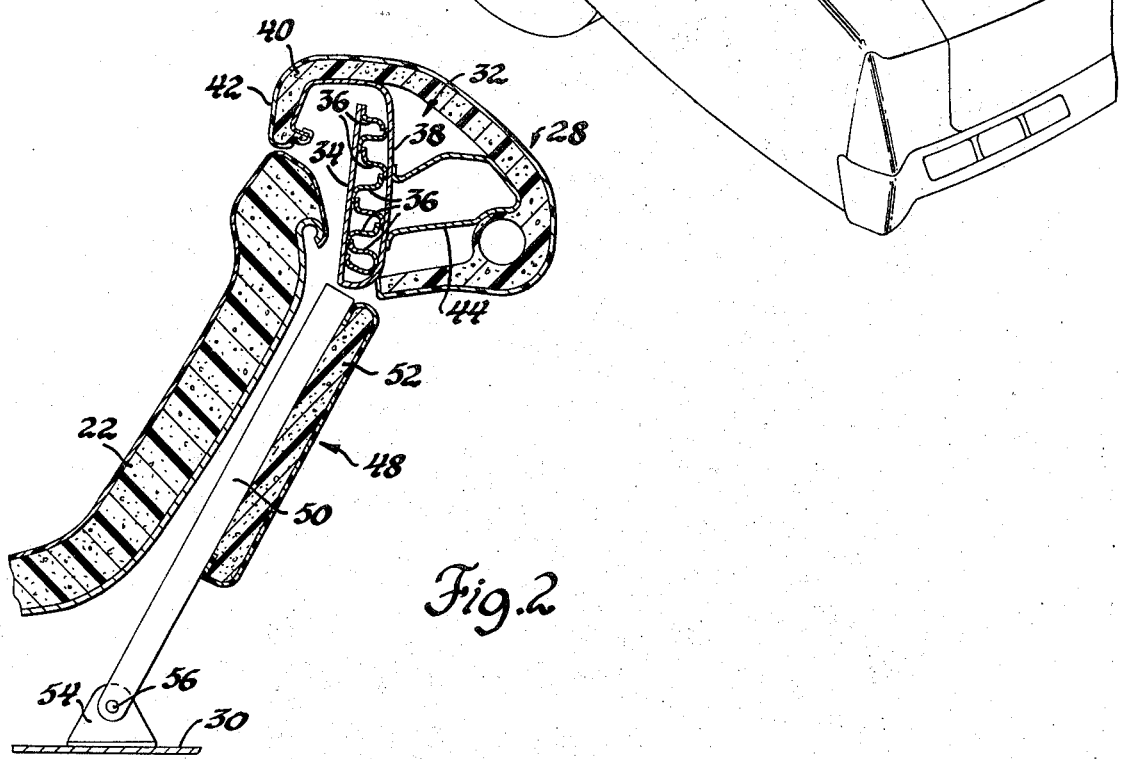
FIG. 2 is an enlarged sectional view taken along line 2—2 of FIG. 1 and showing the mounted relationship of the panel relative to the front seat.

An energy absorbing panel, according to this invention, is generally indicated by 28 and extends between the side pillars 26 of the vehicle body in spaced relationship to the vehicle floor 30 which can be seen by additionally referring to FIG. 2. This panel serves as a headrest for an occupant of front seat 22 and also functions as a frontal restraint for an occupant of rear seat 24. In a manner to be later described, the panel is mounted for forward and rearward energy absorbing movement upon engagement of either one of these occupants with the panel during a vehicle impact so that restraint of the occupant is provided in a cushioned manner.

As seen in FIG. 2, the panel includes an internal supporting structure generally indicated by 32 and consisting of a vertically extending plate 34 to which is welded a number of elongated ogee-shaped members 36 so as to provide a corrugated structure closed at its forward side by plate 34. A padding support member 38 is welded to the rear sides of the ogee-shaped members 36 and extends upwardly and forwardly and then downwardly into proximity with the upper edge of the seat back of front seat 22 so as to provide a support for the conventional padding 40 which covers this panel and which is normally hidden from view by a conventional trim material 42. Another padding support member 44 is welded to the rear side of padding support member 38 and extends rearwardly to support the rear portions of padding 40 which function as a frontal restraint for an occupant of rear seat 24.

It is important to note that the supporting structure for panel 28 must terminate inboard of the side pillars 26 of the vehicle body so that there is no interference of these components which could limit forward or rearward panel movement. However, in order to provide an aesthetically appealing appearance, the end portions 46 of the padding and trim material may overlap the side pillars as shown by FIG. 1. Since these overlapping components of the padding and trim material will not provide an appreciable resistance to deformation, the forward and rearward panel movement that will be later described will not be limited as would be the case if the more rigid supporting structure of the panel overlapped these side pillars.

A center and a pair of outboard knee pads generally indicated by 48 extend generally vertically adjacent the rear side of seat 22 and include support members 50 carrying rearwardly facing trimmed padding 52. The lower ends of support members 50 are pivoted to floor-mounted brackets 54 by way of pins 56. These knee pads 48 are held in position by energy absorbing arrangements that will be later described and cooperate with the panel 28 in providing a frontal restraint for a rear seat occupant during vehicle impact conditions.

The manner in which the right end of panel 28 is supported on the right side pillar 26 of vehicle body 10 will now be described with the understanding that the left panel end is supported on the left side pillar 26 in a symmetrical manner and as such does not necessitate further description.

Figure 3:
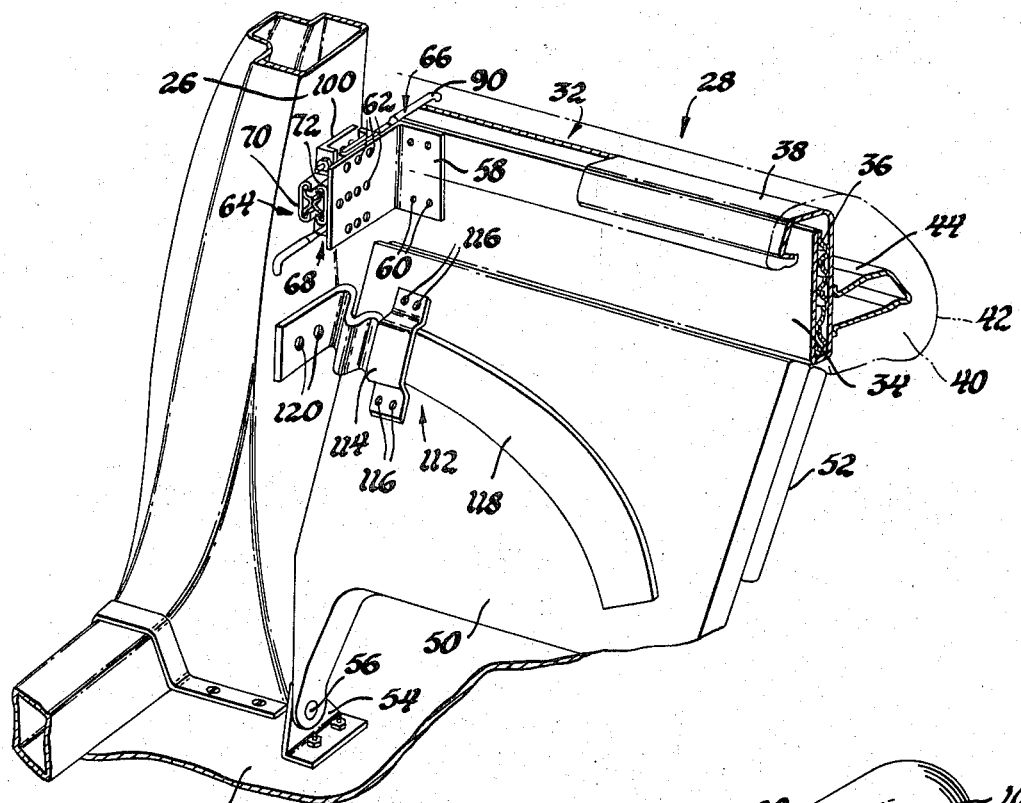
FIG. 3 is a perspective view of the right-hand end of the panel with its padding removed and taken from a forward position looking rearwardly with the front seat also removed so as to show the manner in which the panel is supported for both forward and rearward energy absorbing movement by die and draw rod arrangements.
Figure 4:
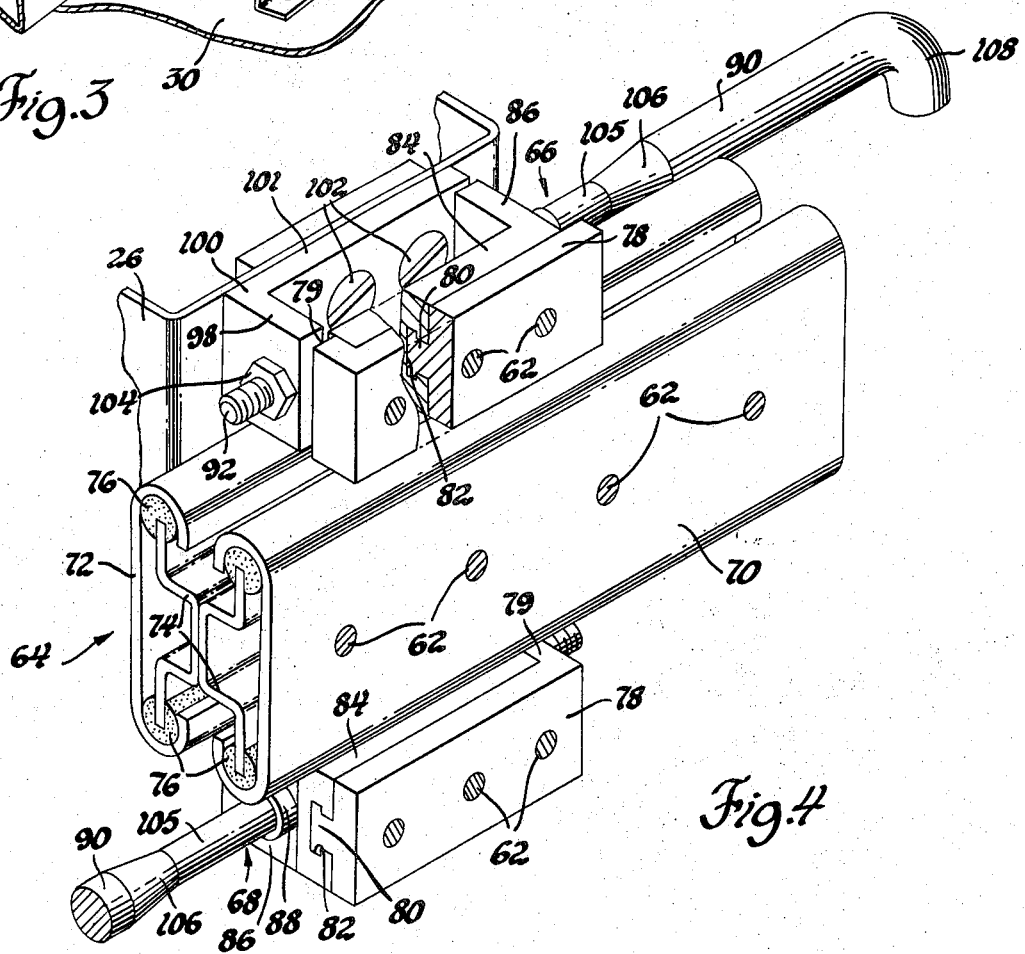
FIG. 4 is an enlarged perspective view of a portion of FIG. 3 with a bracket removed to better show the slidably connected channel members which guide the panel during its forward and rearward movement and the die and draw rod arrangements which absorb energy as this movement takes place.
Figure 5:
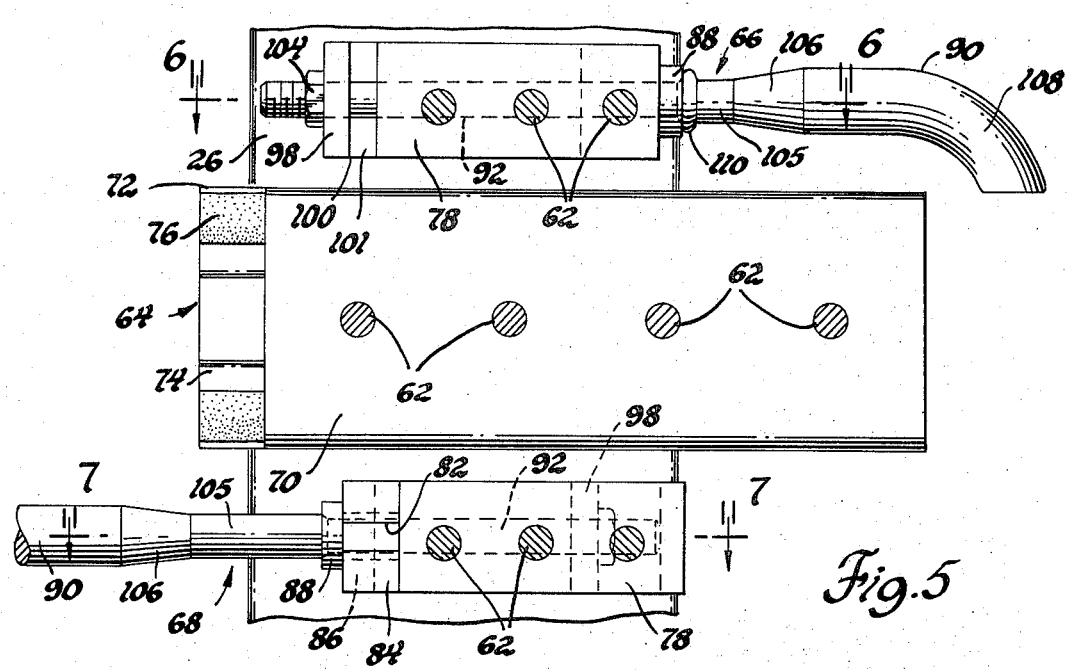
FIG. 5 is a view of the die and draw rod arrangements in which the upper draw rod has been deformed to a certain extent by rearward movement of the panel and the lower arrangement has been slidably released during such deformation.

As seen in FIG. 3, the shorter leg of an L-shaped support plate 58 is secured to the plate 34 of supporting structure 32 within panel 28 by a number of bolts 60. A number of bolts 62 are received by the longer leg of plate 58 and thus secure a slidable track arrangement 64, and upper and lower die and draw rod arrangements 66 and 68 to the panel 28. Referring additionally now to FIGS. 4 through 7, the slidable track arrangement 64 is located between the upper and lower die and draw rod arrangements 66 and 68 and includes a pair of opposed channel members 70 and 72. The bolts 62 secure channel member 70 to the adjacent outboard end of panel 28 as previously described, and a number of bolts which are not shown similarly secure channel member 72 to the side pillar 26 of the vehicle body. A pair of oppositely facing channel-shaped guide members 74 are welded or otherwise suitably secured to each other and have upper and lower flanges supporting plastic slides 76. The channel members 70 and 72 receive these slide members 76 and the panel 28 is thus mounted for either forward or rearward movement relative to the vehicle.

Referring particularly now to FIGS. 3 through 6, the upper die and draw rod arrangement 66 includes a somewhat L-shaped support member 78 which is secured to the support plate 58 on the end of panel 28 by the three uppermost bolts 62 shown in FIG. 3. Support member 78 includes an integral stop portion 79 which extends in an outboard direction at the forward end of this member, and also has an integral elongated tongue portion 80 with a T-shaped cross section. A complementary slot 82 in an L-shaped die carrying member 84 slidably receives the tongue portion 80 so that this die carrying member is slidable rearwardly on support member 78 but is limited against forward movement by engagement with the stop portion 79. The shorter leg 86 of the die carrying member 84 supports an annular die 88 on its rearwardly facing side, the side which faces to the right in FIGS. 5 and 6. The die 88 may be welded or otherwise suitably secured to leg 86 so as to be maintained in position.

The upper die and draw rod arrangement 66 also includes a J-shaped draw rod 90 formed from a suitable ductile material. This draw rod has an elongated cylindrical portion 92 received by the die 88 and extending through an adjacent aligned aperture 94, see FIG. 6, in the leg 86 of die carrying member 84. The cylindrical portion 92 of the draw rod also extends through an aperture 96 in the shorter leg 98 of an L-shaped support member 100. The longer leg 101 of support member 100 is secured to the side pillar 26 of vehicle body 10 by a pair of bolts 102. Forward of the shorter leg 98 of this support member 100, the cylindrical portion 92 of the draw rod is threaded to receive a bolt 104 that seats against the front side of this leg. Rearward of die 88, the draw rod 90 includes a cylindrical portion 105 that is of a diameter slightly larger than the cylindrical portion 92 of the draw rod and the diameter of the aperture formed by the die 88. The cylindrical portion 92 can be inserted through the die since its diameter is slightly smaller than the die aperture, but engagement of the die with cylindrical portion 105 limits the insertion of the draw rod through the die. The rear or right-hand end of the cylindrical portion 105 merges with a frustoconical portion 106 of the draw rod just forward of where the draw rod has an arcuate portion 108 providing its generally J-shaped configuration.

When the energy absorption panel 28 is subjected to a rearwardly directed force during a vehicle impact, the slidable track arrangement 64 guides the panel for rearward movement in the manner previously described. The support member 78 moves rearwardly with the panel due to its fixed mounted relationship relative thereto, and causes its integral stop portion 79 to engage the die carrying member 84 and move it rearwardly. This rearward movement causes the die 88 to move rearwardly and deform the cylindrical portion 105 of the draw rod as shown by 110 in FIGS. 5 and 6. This deformation absorbs energy and thus cushions the rearward movement of the panel 28 during the impact.

It is of course obvious that the level of energy absorbed depends on the ductility of the draw rod and on how much larger the diameter of the cylindrical portion 105 of the draw rod is than the diameter of the die aperture. Also, if the impact is severe enough to cause the die 88 to begin to deform the frustoconical portion 106 of the draw rod, the energy of deformation per unit length of panel movement will be substantially increased due to the increasing diameter of the draw rod during this deformation. Likewise, if the impact is severe enough to cause the die to begin deforming the arcuate portion 108 of the draw rod, the energy of deformation per unit length of movement will be further increased due to the straightening of this arcuate portion as it is deformed by movement through the die 88.

When the panel 28 is subjected to forwardly directed forces during an impact, the support member 78 attached to the panel moves forwardly with it. However, there is no stop portion on the support member 78 that forces the die carrying member 84 to move in this direction with the support member. Thus, any substantial friction between the die and the cylindrical portion 92 of the draw rod or engagement of the shorter leg 86 of the die carrying member with the shorter leg 98 of the support member 100 on the side pillar will cause the die carrying member to slide rearwardly relative to the forwardly moving support member 78 at their sliding connection along tongue portion 80 and slot 82. Consequently, no engagement of the shorter legs of the die carrying member 84 and the support member 100 will limit forward panel movement to any appreciable extent as would be the case if the sliding connection did not release the die carrying member in the manner described.

Figure 6:
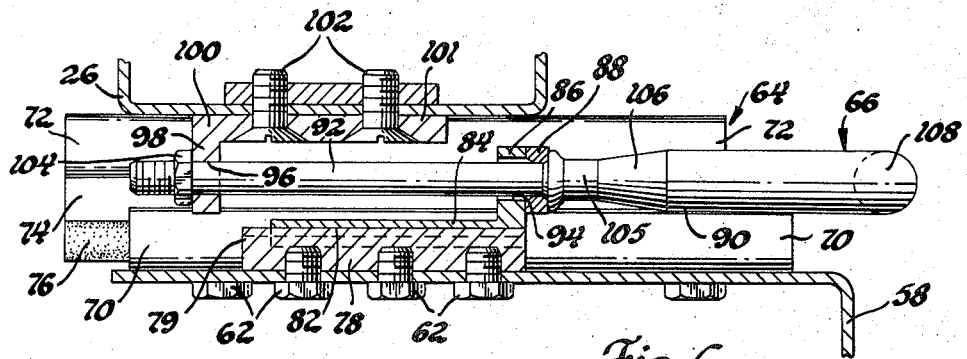
FIG. 6 is a partially sectioned view taken along line 6—6 of FIG. 5 and shows the deformed upper die and draw rod arrangement.
Figure 7:
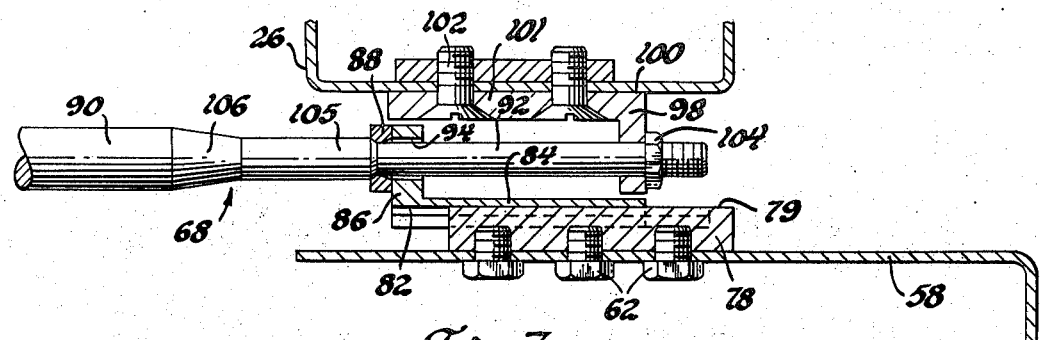
FIG. 7 is a sectional view of the lower die and draw rod arrangement taken along line 7—7 of FIG. 5 and showing the manner in which the lower die and draw rod arrangement has been slidably released during the rearward panel movement.

The lower die and draw rod arrangement 68, see FIGS. 3 through 5 and 7, is similar to the upper arrangement 66 and as such its components are indicated by like numerals. However, in the lower arrangement 68, the draw rod extends in the opposite direction to the upper draw rod and the stop portion 79 of the panel mounted support member 78 allows the lower die carrying member 84, which carries the die on its forward end, to slide in the opposite direction to that allowed with the upper die carrying member. Therefore, as the panel 28 moves rearwardly so that the upper arrangement provides the deformation of its draw rod and consequent energy absorption as described above, friction between the die 88 and the cylindrical portion 92 of the lower draw rod causes the lower die carrying member 84 to slide forwardly relative to the rearwardly moving support member 78 away from stop portion 79 as shown by FIG. 6. The shorter legs of the lower die carrying member 84 and the lower support member 100 thus do not engage each other during rearward panel movement so as to limit or restrain such movement, and the amount of energy absorption per unit length of rearward panel movement is controlled only by the upper die and draw rod arrangement 66. Likewise, the lower die and draw rod arrangement 68 absorbs energy at a controlled level for forward panel movement due to forward movement of the lower die 88 under the impetus of the stop portion 79 of the lower panel mounted support member 78 as it engages and moves the lower die carrying member forwardly with the panel. As the lower arrangement 68 absorbs energy during forward panel movement, the upper die and draw rod arrangement slidably releases the upper die carrying member 84, in the manner previously described, and allows this forward panel movement to proceed without being limited by the upper arrangement 66.

The outboard knee pads 48 of the vehicle body 10 are normally maintained in position by deformable strap arrangements 112, the right-hand one of which can be seen in FIG. 3. Each of these arrangements includes a somewhat flattened U-shaped member 114 secured to the forward face of the support member 50 of the knee pad by way of bolts 116. A deformable strap 118 is received between the support member 50 of the knee pad and the opening defined by the member 114. The outboard end of the strap is secured to the adjacent side pillar of the vehicle body 10 by way of bolts 120. Engagement of one of the outboard knee pads by the knees of a forwardly moving rear seat occupant during an impact pivots the knee pad forwardly and in doing so deforms strap 118 to absorb energy. This energy absorption cushions the frontal restraint the outboard knee pads provide to outboard rear seat occupants during impacts.

The center knee pad 48 also includes an energy absorbing device, which is not shown by the drawings, for providing a cushioning effect to the manner in which the center knee pad restrains a center rear seat occupant during impacts. This energy absorbing device may consist of a deformable strap arrangement similar to the above-described arrangement 112 and extending between the center knee pad and one or both of the outboard knee pads. Also, this energy absorbing device may extend directly between the center knee pad and the vehicle body floor structure or some other fixed portion of the vehicle body.

By providing each rear seat occupant with an individual knee pad instead of a common one, the energy absorbing components of each knee pad can provide energy absorption at a level which will cushion each occupant without being influenced by the adjacent occupant. This individualized restraining of the rear seat occupants thus prevents the inertia forces of a heavy rear seat occupant from causing an adjacent lighter occupant from being restrained in too harsh a manner.

It is evident from the foregoing description that this invention provides an improved energy absorbing panel for a vehicle body.

What is claimed is:

1. In a vehicle body defining an occupant compartment and having side pillars extending vertically at each side of this compartment intermediate the forward and rearward ends thereof, the combination comprising, an elongated panel extending between the side pillars of the vehicle body within the occupant compartment, means mounting each end of the panel on the adjacent side pillar to allow forward or rearward panel movement, a first pair of die and draw rod arrangements, each of which is mounted between a respective end of the panel and the adjacent side pillar so as to absorb energy during forward panel movement, a second pair of die and draw rod arrangements, each of which is mounted between a respective end of the panel and the adjacent side pillar so as to absorb energy during rearward panel movement, means for releasing the first pair of die and draw rod arrangements from their mounted relationship between the panel and the side pillars as the panel moves rearwardly so that these arrangements do not limit rearward panel movement, and means for releasing the second pair of die and draw rod arrangements from their mounted relationships between the panel and the side pillars as the panel moves forwardly so that these arrangements do not limit forward panel movement.

2. In a vehicle body defining an occupant compartment and having side pillars extending vertically at each side of this compartment intermediate the forward and rearward ends thereof, the combination comprising, an elongated panel extending between the side pillars of the vehicle body within the occupant compartment, elongated slide means located between each end of the panel and the adjacent side pillar so as to support the panel for forward or rearward panel movement, a first pair of die and draw rod arrangements, each of which is mounted between a respective end of the panel and the adjacent side pillar so as to absorb energy during forward panel movement, a second pair of die and draw rod arrangements, each of which is mounted between a respective end of the panel and the adjacent side pillar so as to absorb energy during rearward panel movement, slidable means for releasing the first pair of die and draw rod arrangements from their mounted relationship between the panel and the side pillars as the panel moves rearwardly so that these arrangements do not limit rearward panel movement, and slidable means for releasing the second pair of die and draw rod arrangements from their mounted relationship between the panel and the side pillars as the panel moves forwardly so that these arrangements do not limit forward panel movement.

3. In a vehicle body including a floor supporting a front seat intermediate the forward and rearward ends of the occupant compartment thereof, and having side pillars extending vertically at each lateral side of this seat, the combination comprising:
an elongated panel extending between the side pillars in proximity to an upper portion of the seat back of the front seat so as to serve as a headrest for a front seat occupant and a frontal restraint for a rear seat occupant, the panel being maintained in spaced relationship to the floor of the vehicle body;

elongated slide means located between each end of the panel and the adjacent side pillar and including a pair of opposed channel members at each panel end, one of which is mounted on the adjacent side pillar and one of which is mounted on the panel end, and a slide member slidably interconnecting each pair of opposed channel members to support the panel for forward or rearward movement;

a first pair of die and draw rod arrangements, each of which includes tongue and slot means slidably mounting it between a respective end of the panel and the adjacent side pillar so as to absorb energy during forward panel movement and so as to be slidably released from its mounted relationship as the panel moves rearwardly such that these arrangements do not limit rearward panel movement;

a second pair of die and draw rod arrangements, each of which includes tongue and slot means slidably mounting it between a respective end of the panel and the adjacent side pillar so as to absorb energy during rearward panel movement and so as to be slidably released from its mounted relationship as the panel moves forwardly such that these arrangements do not limit forward panel movement; and a pair of outboard knee pads and a center one, each of which is mounted on the vehicle body floor generally below the panel for movement forwardly relative to the vehicle body upon engagement thereof by the knees of an occupant, and each of which includes an energy absorbing device for cushioning the forward movement of its associated knee pad.

* * * * *